United States Patent
Moosburger

(10) Patent No.: US 7,706,053 B2
(45) Date of Patent: Apr. 27, 2010

(54) LIGHT SOURCE WITH CONVERSION ELEMENT AND FIBER OPTICS

(75) Inventor: Jürgen Moosburger, Regensburg (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 12/233,833

(22) Filed: Sep. 19, 2008

(65) Prior Publication Data

US 2009/0086309 A1   Apr. 2, 2009

(30) Foreign Application Priority Data

Sep. 28, 2007   (DE)   ........................ 10 2007 046 611

(51) Int. Cl.
  *G02F 1/35* (2006.01)
  *G02F 2/02* (2006.01)
(52) U.S. Cl. ........................ 359/326; 372/22; 359/332
(58) Field of Classification Search ................ 385/122; 359/326–332; 372/6, 21, 22
See application file for complete search history.

(56) References Cited

U.S. PATENT DOCUMENTS

| | | | |
|---|---|---|---|
| 5,036,220 A | * | 7/1991 | Byer et al. ................. 359/328 |
| 6,066,861 A | | 5/2000 | Hohn et al. |
| 7,078,732 B1 | | 7/2006 | Reeh et al. |
| 7,339,960 B2 | * | 3/2008 | Yamamoto et al. ............ 372/21 |
| 7,422,356 B2 | | 9/2008 | Hama et al. |

FOREIGN PATENT DOCUMENTS

| | | |
|---|---|---|
| EP | 1 734 302 | 12/2006 |
| EP | 1 795 798 | 6/2007 |
| JP | 2005-328921 | 12/2005 |
| WO | WO 97/50132 | 12/1997 |
| WO | WO 98/12757 | 3/1998 |
| WO | 03/021329 | 3/2003 |

OTHER PUBLICATIONS

European Search Report for Application No. 08164447.8-2216 dated Dec. 5, 2008.

* cited by examiner

*Primary Examiner*—Daniel Petkovsek
(74) *Attorney, Agent, or Firm*—Fish & Richardson P.C.

(57) ABSTRACT

A light source can have a conversion element disposed at one end of an optical waveguide and a semiconductor light source disposed at the other end. The optical waveguide can include a heat-conducting layer at its end proximate the converter.

11 Claims, 3 Drawing Sheets

LIGHT SOURCE WITH CONVERSION ELEMENT AND FIBER OPTICS

RELATED APPLICATIONS

This application claim priority under 35 USC §119 of German Application No. 10 2007 046 611.2, filed Sep. 28, 2007, the content of which is incorporated by reference in its entirety.

TECHNICAL FIELD

The disclosure relates to a light source with a conversion element, in which at least a portion of a primary radiation emitted by a semiconductor light source is wavelength-converted. The disclosure is further directed to an optical waveguide. Lastly, the disclosure is directed to a method for making said light source and its use.

BACKGROUND

A component with a conversion element is known, for example, from WO 97/50132. It includes a semiconductor chip which in operation emits a primary radiation, and a luminescence-based conversion element by which a portion of the primary radiation is converted to light of another wavelength. The resulting visually perceptible radiation from the semiconductor light source is created by the superimposition of the primary radiation and the secondary or converted radiation, making it possible, in particular, to produce light sources that are capable of emitting white light. The radiation conversion produced in the conversion element in this case is based on luminescence or fluorescence.

SUMMARY

The object underlying the invention is to disclose a different option for a light source with a conversion element and an optical waveguide. A further object is to disclose a method of making said light source and its use.

According to at least one embodiment of the light source, the light source includes a semiconductor light source and an optical waveguide, a conversion element being disposed at one end of the optical waveguide and the semiconductor light source being disposed at the other end of the optical waveguide.

Said light source, in which a conversion element is disposed at a front end of an optical waveguide and a semiconductor light source couples light into the optical waveguide at the other end of the light guide, makes it possible to emit, at low cost and at specific locations, mixed radiation formed by superimposing the primary radiation from the semiconductor light source and the secondary radiation from the conversion element. The light source further makes it possible to generate nearly punctiform light that depends ultimately only on the diameter or the radiation-conducting core diameter of the optical waveguide. The front end is also referred to as the facet of the optical waveguide or of the optical fiber.

A particular advantage of the light source is that a plurality of suitably arranged optical waveguides with associated conversion elements can be used in combination with only one semiconductor light source to create a corresponding plurality of substantially punctiform light sources. The semiconductor light source used is preferably a laser diode, whose primary radiation can be coupled very efficiently into the optical waveguide and can be transmitted through the optical waveguide. The color space according to the CIE chromaticity diagram can be matched to the desired requirements at the other end of the optical waveguide through the choice of conversion element or phosphor.

According to at least one embodiment of the light source, the conversion element contains at least one phosphor from the group of chlorosilicates, orthosilicates, sulfides, metal thiols and vanadates, aluminates, oxides, halophosphates, nitrides, sions and sialons, rare-earth garnets such as YAG:Ce and the alkaline earth elements.

Particularly advantageously, the conversion element is formed using a phosphor that is embedded in a matrix substance. Suitable phosphors are, for example, inorganic phosphors such as rare earths, particularly Ce, doped garnets, or organic phosphors, such as perylene phosphors. Additional suitable phosphors are listed, for example, in WO 98/12757, whose content in that regard is hereby incorporated by reference.

An advantageous light source contains a converter comprising YAG:Ce and a rare-earth garnet, as a typical phosphor, and generates white mixed light in combination with a semiconductor component emitting blue primary radiation. Candidate semiconductor components are a laser diode or a light-emitting diode.

Additional phosphors and phosphor mixtures that are suitable for use as converters are: chlorosilicates, orthosilicates, sulfides, metal thiols and vanadates, aluminates, oxides, halophosphates, nitrides, sions and sialons, rare-earth garnets and alkaline earth elements. This list is not definitive.

Full-area coating of the front end of the optical waveguide makes it possible to use the primary radiation passing through the optical waveguide efficiently for radiation conversion, and thus to create an efficient light source.

In a particularly advantageous light source with a conversion element, the optical waveguide has a heat-conducting layer at the end assigned to the conversion element. It is thereby possible to limit the heating of the conversion element caused by the incoming primary radiation, and thus to increase the efficiency of the converter.

It has proven particularly advantageous to completely encase the optical waveguide in the heat-conducting layer at the end proximate the conversion element. That is, the lateral surfaces of the optical waveguide are completely covered, at least at that end, by material of the heat-conducting layer.

In a preferred configuration, the heat-conducting layer contains one or more metals. A particularly efficient light source is obtained if the heat-conducting layer contains gold or aluminum.

To create a particularly resource-sparing and inexpensive light source, the heat-conducting layer has a predetermined length along the cladding of the optical waveguide. It is thereby possible, on the one hand, to cool the conversion element efficiently, and on the other hand, not to employ heat-conducting material unnecessarily. That is, the optical waveguide is not completely encased in the heat-conducting layer, but only along a predetermined length that can depend on the material used for the heat-conducting layer. For example, the optical waveguide is encased along a length of at most 50 mm from its front end. It is then preferably encased over a length of at least 10 mm from its front end.

An optical waveguide according to the invention is particularly advantageously coated with a conversion element at its front end. With particularly full-area coating, the primary radiation striking the conversion element at the end of the optical waveguide is used very efficiently to generate the secondary radiation.

It is particularly advantageous if the optical waveguide is additionally provided with, and particularly encased in, a heat-conducting layer at the end coated with the conversion element, so that the heat developed in the conversion element as a result of the incoupled primary radiation is dissipated as efficiently as possible in order to cool the conversion element. Particularly efficient cooling has been found to occur with a heat-conducting layer that contains metal. Particularly suitable metals, in turn, are gold and aluminum.

A particularly resource-sparing and inexpensive optical waveguide is one in which the heat-conducting layer has a predetermined length along the cladding of the optical waveguide. It is thereby possible, on the one hand, to cool the conversion element efficiently, and on the other hand, not to employ heat-conducting material unnecessarily.

The optical waveguide is particularly preferably coated with a conversion element that contains a phosphor from the group of chlorosilicates, orthosilicates, sulfides, metal thiols and vanadates, aluminates, oxides, halophosphates, nitrides, sions and sialons, rare-earth garnets such as YAG:Ce and the alkaline earth elements.

It has proven very advantageous to assemble an optical waveguide with a conversion element at a front end and to place a connector, particularly a standard connector, at the other end. It is thereby possible to couple the optical waveguide to any other optical waveguide and thus to broaden the range of application of the optical waveguide, as well as to create a particularly low-cost solution for light transmission over longer distances.

In the method for making a light source with an optical waveguide, it has proven particularly advantageous to coat a front end of the optical waveguide, particularly full-areally, with a conversion element and thus to use the primary radiation exiting at that end very efficiently for radiation conversion. The conversion element can be glued to the front end of the optical waveguide with a glue or by means of the matrix substance in which the phosphor is embedded.

The use of a light source in display systems, and particularly in automotive technology, has the advantage that light sources can be created at different locations with only one semiconductor light source and a plurality of optical waveguides that are coupled to it, each having a conversion element disposed at its free end.

DESCRIPTION OF THE DRAWINGS

Further advantages and preferred embodiments will emerge from the following description of the exemplary embodiments, taken in conjunction with FIGS. 1 to 6. The figures are purely schematic and are not true to scale. Therein.

DETAILED DESCRIPTION

Figure 1:
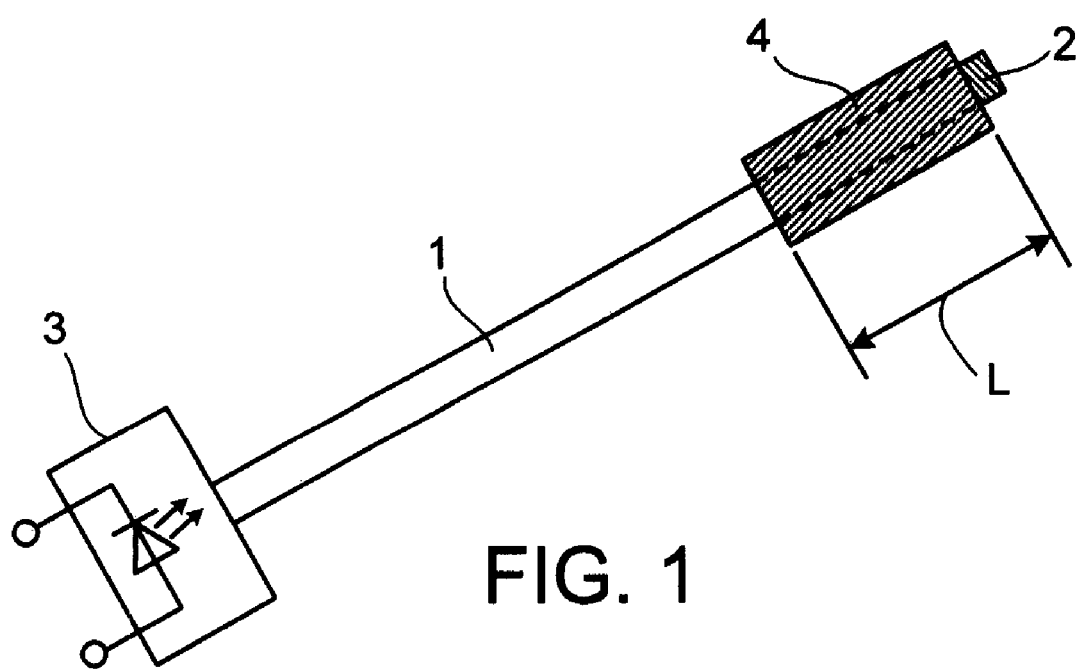
FIG. 1 is a schematic representation of the light source with a heat-conducting layer at the end proximate the converter.

FIG. 1 shows a light source in which an optical waveguide 1 is coated at one end—the front end—with a conversion element 2, while disposed at the other end of the optical waveguide 1 is a semiconductor light source 3. The semiconductor light source couples light of a primary radiation into the optical waveguide, said light, on exiting the optical waveguide at the end proximate the converter, being used at least in part to excite the phosphor in the (luminescence) converter. The phosphor converts the incoming light into a secondary radiation, with the result that the primary radiation and the secondary radiation are superimposed as they exit the optical waveguide and a mixed light is generated. The phosphor is preferably embedded in a matrix.

To better dissipate the heat developed in the converter, the optical waveguide is provided with a heat-conducting cladding 4. The cladding is so implemented as to efficiently dissipate the heat developed in the converter, particularly by direct contact with the luminescence converter 2. The heat-conducting layer 4 extends over the optical waveguide for only a length necessary for efficient heat dissipation. In this exemplary embodiment of the invention, the heat-conducting layer 4 is implemented as a metallic layer of gold or aluminum.

Figure 2:
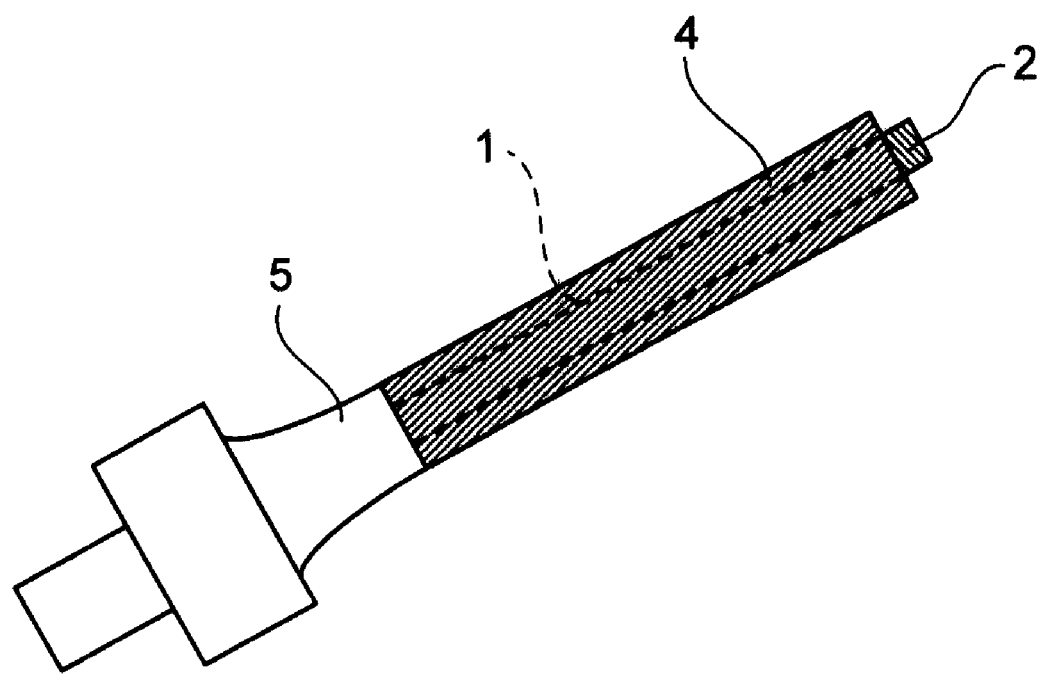
FIG. 2 is a schematic view of the optical waveguide with a heat-conducting layer.

FIG. 2 schematically shows an optical waveguide 1 with a converter 2, in which the optical waveguide is provided with a heat-conducting cladding to better dissipate the heat developed in the converter. The cladding is so implemented as to be in direct contact with the luminescence converter 2. In this embodiment of the invention, the heat-conducting layer 4 is implemented as a metallic layer of gold or aluminum. The optical waveguide, which is short in this instance, can be coupled to standard optical waveguides by means of a coupling connector 5 disposed at the opposite end from the converter 2, particularly a standard connector such as an FC or SMA connector.

It has been found, as also illustrated in FIG. 1, that the heat-conducting layer need have only a predetermined length, and a layer length beyond said length brings about no substantial further improvement in heat dissipation. The optimum length of the heat-conducting layer depends on the heat-conducting material, the thickness of the heat-conducting cladding and the wavelength of the incoming primary radiation. In addition, the dimensioning of the heat-conducting cladding depends on the converter of the (luminescence) converter.

In dimensioning the heat-conducting layer 4, it must be taken into account that the converter has a less than 100% initial efficiency which depends on the type of converter and the excitation wavelength of the semiconductor light source, and it therefore heats up. This heating is compensated for by the cooling performed by the heat-conducting material. Otherwise, the efficiency of the heated phosphor would keep decreasing, resulting in a further increase in heating, and so on (positive feedback).

Figure 3:
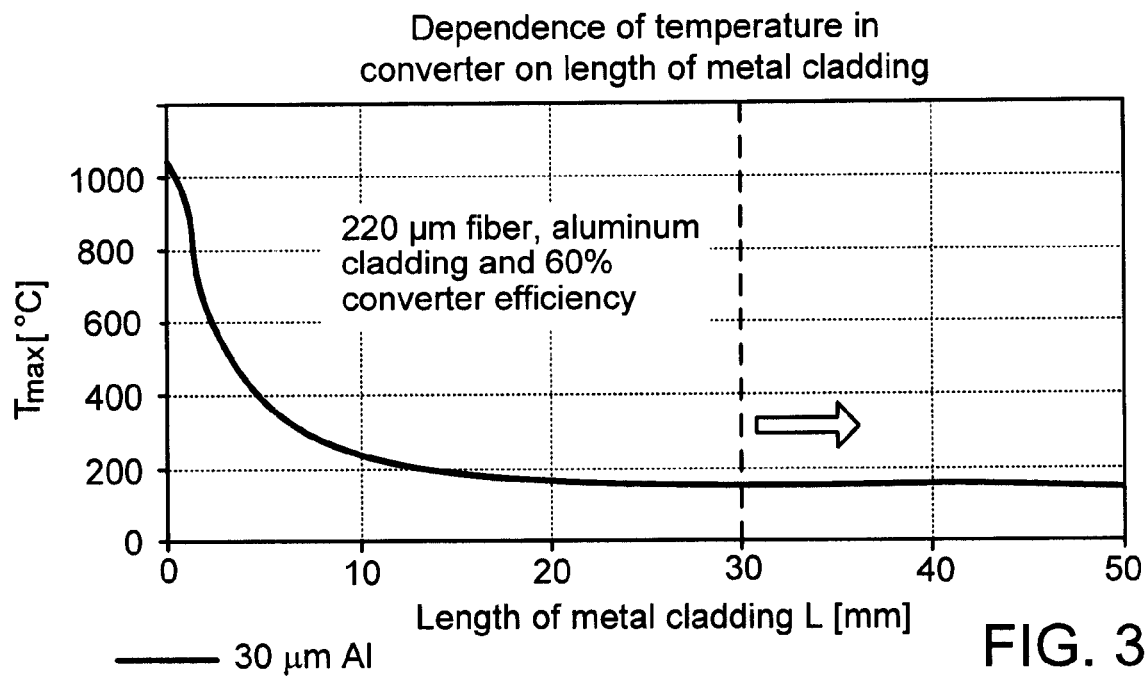
FIG. 3 is a schematic curve representing the dependence of converter temperature on the length of the heat-conducting layer.
Figure 4:
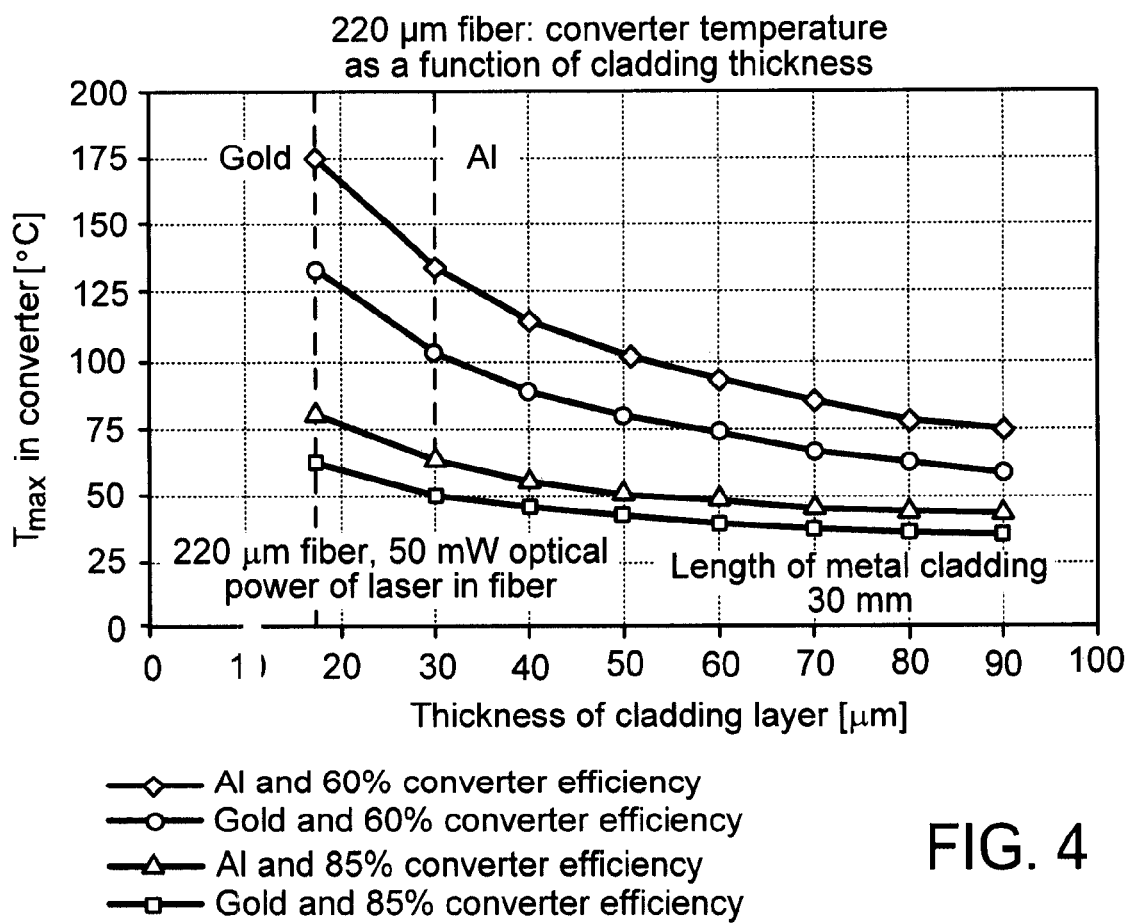
FIG. 4 is a graph representing converter temperature as a function of the cladding thickness of the heat-conducting layer and a first diameter of the optical waveguide and FIG. 5 is essentially the same graph as in FIG. 4, but with another diameter for the optical waveguide.
Figure 5:
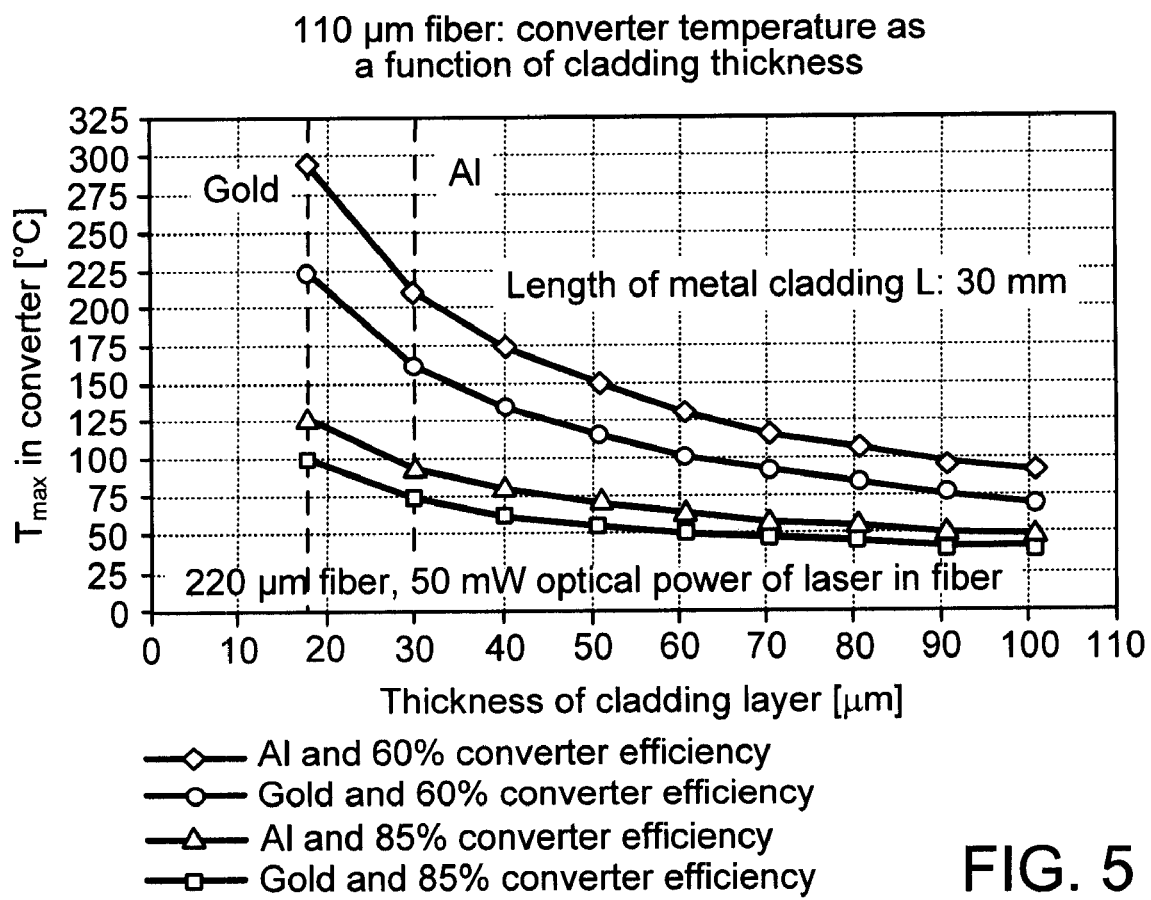

The parameter curves for dimensioning the heat-conducting layer, which are illustrated in FIGS. 3 to 5, give an idea of the heating of a converter layer on a multimode optical waveguide facet under different operating parameters. The parameters used here are the diameter of the optical waveguide, the thickness and the material of the heat-conducting cladding layer, and the conversion efficiency of the luminescence converter. The primary radiation is assumed in this case to be a radiation with an optical power of 50 mW emitted by a blue laser and coupled in its entirety into the optical waveguide. The cases illustrated are ones in which, given an excitation wavelength of 390 nm, 40% of the optical power is converted into thermal dissipation power, and given an excitation wavelength of 440 nm, 15% is converted into thermal dissipation power. This results in efficiencies of 60% and 85%, respectively.

The diagrams relate to optical waveguides having a core diameter of 100 μm and an overall diameter of 110 μm and, in each case, an optical waveguide of twice that diameter, i.e. an overall diameter of 220 μm.

To avoid unnecessarily comprising converter efficiency, the temperature of the luminescence converter should not exceed 100° C. It can be seen from the curves of FIGS. 3 to 5 that both for an optical waveguide with a diameter of 220 μm and one with a diameter of 110 μm, the commercially available standard metallization thicknesses of 17 μm for gold and 30 μm for aluminum are adequate, within the limits of dimensional tolerances, for efficient cooling of the luminescence converter at a wavelength of 440 nm. With an excitation wavelength of 390 nm and a converter efficiency of only 60%, the thickness of the metallization, which depends on the diameter of the optical waveguide for both gold and aluminum, must be appreciably greater. Numerical values for the thickness of the metallization in μm, based on a converter temperature <100° C. and room temperature, are presented in Table 1:

TABLE 1

|  | $\lambda$ = 390 nm/ Eff. = 60% | | $\lambda$ = 440 nm/ Eff. = 85% | |
| --- | --- | --- | --- | --- |
|  | Gold | Aluminum | Gold | Aluminum |
| Diameter 220 μm | 30 | 50 | 18 | 18 |
| Diameter 110 μm | 60 | 85 | 18 | 25 |

It has also been found that converter temperature is independent of length beginning with a length L for the heat-conducting metal cladding of as little as 30 mm in the case of aluminum and 20 mm for gold, calculated from the converter to the facet of the optical waveguide or its front end, parallel to the direction of the main axis of the optical waveguide. It is therefore sufficient to clad only a small segment of the optical waveguide in metal.

This short fiber segment can be coupled to standard optical waveguides by means of a coupling connector 5, particularly a standard connector such as an FC or SMA connector (see FIG. 2), thus permitting a favorable effect on the cost of the light source as a whole.

For example, a length L for the heat-conducting layer 4 that is between at least 20 mm and at most 30 mm proves to be particularly advantageous in the case of a heat-conducting layer 4 consisting of gold or containing primarily gold. Likewise, a length L for the heat-conducting layer 4 that is between at least 30 mm and at most 40 mm proves to be particularly advantageous in the case of a heat-conducting layer 4 consisting of aluminum or containing primarily aluminum. The thickness of the cladding can then be selected, for example, according to the above-cited table and/or as given in FIGS. 4 and 5.

The heat-conducting layer 4 is preferably deposited on the optical waveguide in structured form. That is, the optical waveguide is not first coated completely with the material of the heat-conducting layer 4 and the thus-deposited layer then structured, but rather, the heat-conducting layer 4 is deposited directly in the desired length L and with the desired thickness.

Figure 6:
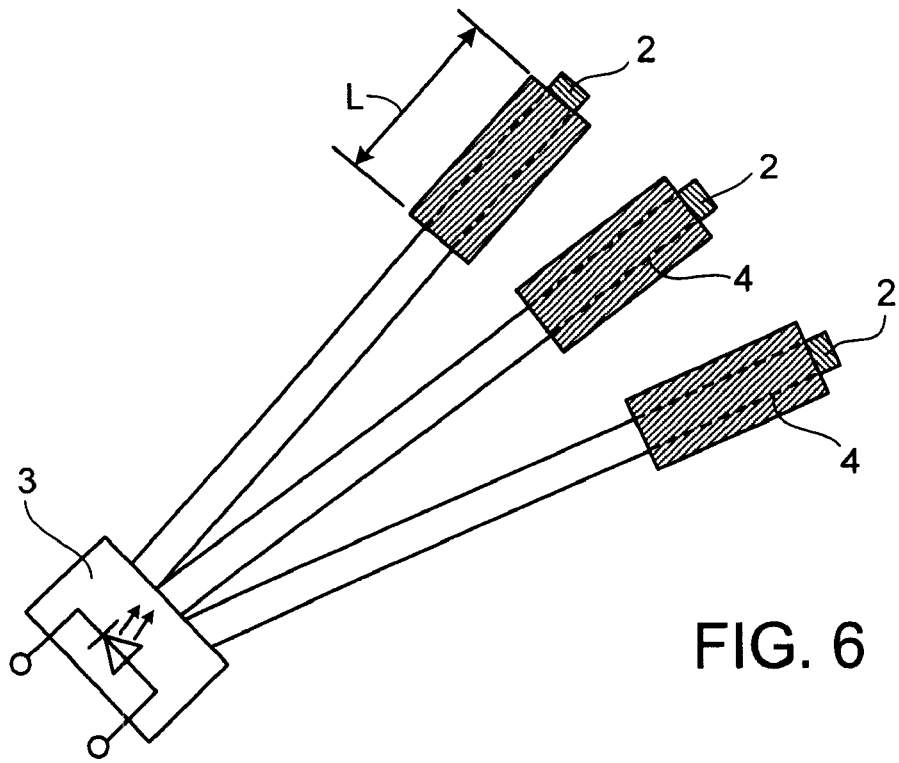
FIG. 6 is a schematic representation of the light source with a plurality of optical waveguides.

There follows a more detailed description, in conjunction with FIG. 6, of an exemplary embodiment of a here-described light source in which a plurality of optical waveguides 1—here, by way of example, three optical waveguides 1—are optically connected to the same semiconductor light source 3. A conversion element 2 is disposed at the front end of each optical waveguide 1. Said conversion elements 2 can be different conversion elements, such that each conversion element 2 is able to emit light of a different color. Furthermore, each optical waveguide 1 is clad up to a certain length L in a heat-conducting layer 4. The optical waveguides 1 in this case are preferably not coated over their entire length with the material of the heat-conducting layer 4. The optical waveguides 1 thus are particularly flexible, at least in regions not provided with the heat-conducting layer 4.

The invention is not limited to the exemplary embodiments by the description of it with reference thereto. Rather, the invention encompasses any novel feature and any combination of features, including in particular any combination of features recited in the claims, even if that feature or combination itself is not explicitly mentioned in the claims or exemplary embodiments.

The invention claimed is:

1. A light source comprising:
a semiconductor light source; and
at least one optical waveguide, wherein a conversion element is disposed at one end of said at least one optical waveguide and said semiconductor light source is disposed at the other end of said at least one optical waveguide, wherein
said optical waveguide includes a heat-conducting layer for dissipating the heat from said conversion element,
said heat-conducting layer completely encases said optical waveguide at the end proximate said conversion element,
said heat-conducting layer consists of a metal, and
said heat-conducting layer has a length of at least 10 mm and at most 50 mm.

2. The light source of claim 1, wherein said semiconductor light source is a laser diode.

3. The light source of claim 1, wherein said semiconductor light source couples blue primary radiation into said optical waveguide.

4. The light source of claim 1, wherein said optical waveguide is coated full-areally on its front face with said conversion element.

5. The light source of claim 1, wherein said heat-conducting layer is in direct contact with said optical waveguide and with said conversion element.

6. The light source of claim 1, wherein said heat-conducting layer contains gold or aluminum.

7. The light source of claim 1, wherein said heat-conducting layer consists of gold and has a length (L) of at least 20 mm and at most 30 mm.

8. The light source of claim 7, wherein said heat-conducting layer consists of gold and has a thickness of at least 30 μm.

9. The light source of claim 1, wherein said heat-conducting layer consists of aluminum and has a length (L) of at least 30 mm and at most 40 mm.

10. The light source of claim 9, wherein said heat-conducting layer consists of aluminum and has a thickness of at least 50 μm.

11. The light source of claim 1, further comprising a plurality of optical waveguides and exactly one semiconductor light source, all of said optical waveguides being optically connected to said semiconductor light source.

* * * * *